Oct. 20, 1925.  
S. L. JONES  
CUTTER  
Filed Sept. 19, 1924  
1,558,369  
2 Sheets-Sheet 1
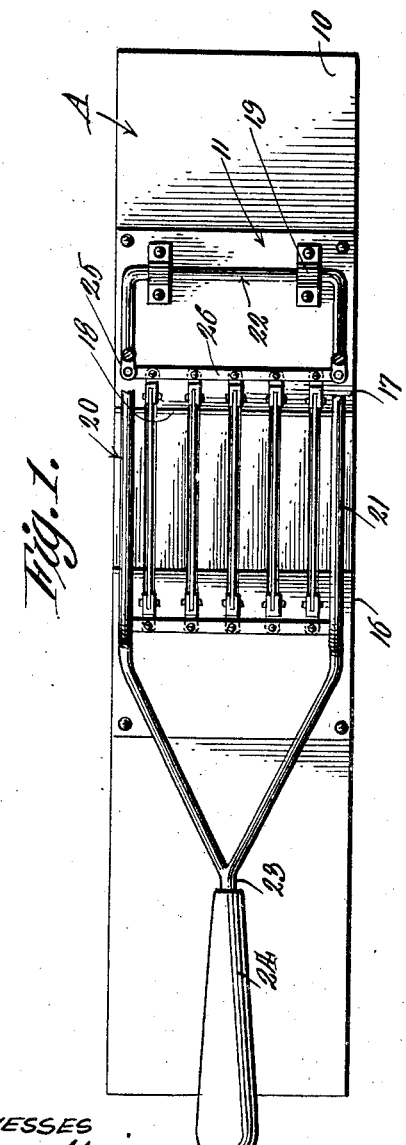
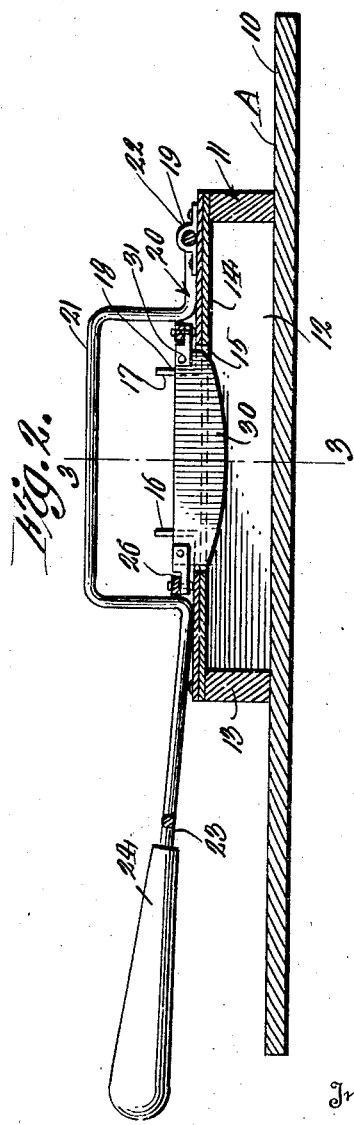
WITNESSES
Inventor  
SAMUEL L. JONES  
By Richard B. Owen  
Attorney Oct. 20, 1925.
S. L. JONES
1,558,369
CUTTER
Filed Sept. 19, 1924    2 Sheets-Sheet 2
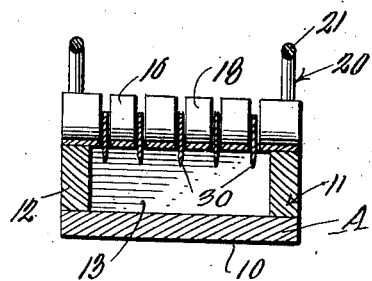
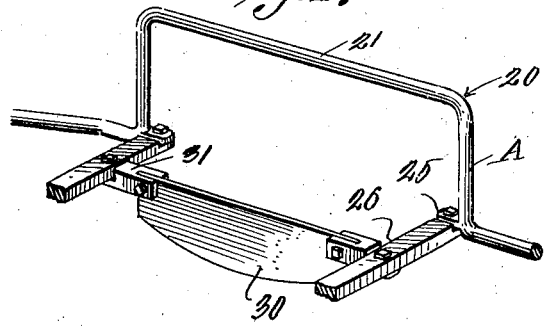
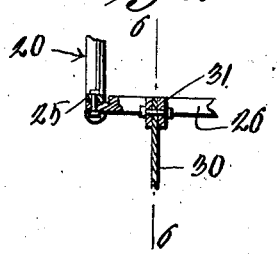
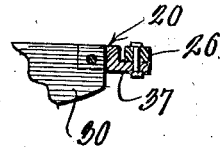
Inventor
SAMUEL L. JONES Patented Oct. 20, 1925.

1,558,369

UNITED STATES PATENT OFFICE.

SAMUEL L. JONES, OF LONGTON, KANSAS.

CUTTER.

Application filed September 19, 1924. Serial No. 738,607.

*To all whom it may concern:*

Be it known that I, SAMUEL L. JONES, a citizen of the United States, residing at Longton, in the county of Elk and State of Kansas, have invented certain new and useful Improvements in Cutters, of which the following is a specification.

This invention appertains to cutting mechanism and more particularly to a device for making a plurality of cuts at one time.

The primary object of the present invention is the provision of a novel machine for facilitating the cutting up of fat meat and the like for the manufacture of lard, which is so constructed that the meat can be cut up into a plurality of pieces with one operation of a knife member, without any danger to the operator of the device.

A further object of the invention is to provide a novel cutter embodying a base block and an operating member including a plurality of equi-distantly spaced knives, the block including guides for the knives, said guides also forming means for receiving the material to be cut.

A further object of the invention is to provide novel means for constructing the blades whereby the cut can be readily made with a minimum amount of effort.

A still further object of the invention is to provide an improved cutting device of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a top plan view of the improved cutter,

Figure 2 is a longitudinal section through the same,

Figure 3 is a transverse section through the cutter taken on the line 3—3 of Figure 2, Figure 4 is a detail fragmentary view of the pivoted frame for carrying the cutting knives, one of the knives being shown in position on the same, Figure 5 is a fragmentary sectional view of a portion of the frame showing the means for connecting one of the knives thereto, Figure 6 is an enlarged detail sectional view through the frame taken on the line 6—6 of Figure 5.

Referring to the drawings in detail wherein similar reference characters designates corresponding parts throughout the several views the letter A generally indicates the improved cutter, which comprises a base block 10 on which is secured in any preferred way the meat or cutter block 11, which is of a novel construction as now will be described. This block 11 is of a hollow construction and includes the side and end walls 12 and 13 respectively and a top wall 14 which can be made of heavy sheet metal. This top wall 14 is provided with a plurality of equi-distantly spaced longitudinally extending slots 15.

The upper surface of the top wall 13 of the block 11 at the opposite ends thereof is provided with guides 16 and 17 for a purpose which will be hereinafter more fully described. Each of the guides 16 and 17 include a plurality of equi-distantly spaced guide tongues.

It is to be understood that the guide tongues 18 of the guides 16 and 17 are arranged in direct longitudinal alinement and that the spaces between the guide tongues defines guides for the cutting knives. The upstanding tongues 18 of the guides 16 and 17 also form means for receiving the meat or other material to be cut which is laid upon the cutting block 11 and these tongues prevent the slipping of the material on the block during the cutting process.

The upper face of the block 11 in rear of the guide 17 is provided with transversely alined hinge barrels 19 for pivotally supporting the cutting member 20 which will now be described.

The inverted U-shaped members 20 and 21 permit the operation of the cutting member 20 without interfering with the guides 16 and 17 and allow the knives 30 to readily penetrate the meat, without the same coming into contact therewith.

The cutting member 20 includes a pair of spaced longitudinally extending inverted U-shaped bars 21 which are connected at their rear ends by an integral cross bar 22 which is rockably mounted in the hinge barrels 19. The forward ends of the bar are extended and converge toward one another to form a shank 23 which supports any preferred type of handle 24.

Pair of inwardly extending lugs 25 are formed on the bars 21 and these lugs have bolted thereto transversely extending cross bars 26 for supporting the cutting knives 30. These cutting knives 30 have an arcuate cutting edge in order to facilitate the penetration of the material to be cut and owing to the fact that the same is hinged at its rear end, the knives will be brought down at an angle in engagement with the work thus bringing about a shearing cut. The terminals of the knives have secured thereto shanks 31 which are bolted to the cross bars 26. The knives are also arranged in any distance relative to one another that may be desired and according to the material to be cut.

In use of the improved implement the material to be cut is placed directly upon the cutting block 11 between the guides 16 and 17 after which the handle 24 is grasped and swung downwardly bringing all of the knives into engagement with the material at one time. The knives can ride into the slots 15 in the top wall 14 of the base block 11 and thus are permitted to cut entirely through the material. It is obvious that the material will be cut into a number of different pieces simultaneously.

While the device is particularly adapted for cutting fat meat into the manufacture of lard, it is to be understood that the cutting implement can be made into various sizes to permit the same to be used for different purposes.

Changes as to details may be made without departing from the spirit or the scope of this invention, but what I claim as new is:—

1. A cutter of the character described comprising a base block, upstanding parallel guides carried by the ends of the base block for receiving the material to be cut therebetween, a pivoted frame, an operating handle for the frame, and a plurality of equi-distantly spaced knives carried by the frame, the guides being provided with spaces for receiving the knives to guide the same during the cutting operation.

2. In a cutter of the purpose specified, a cutter block, upstanding parallel guides carried by the opposite ends of the cutter block for receiving the material to be cut therebetween, a swinging frame, a plurality of cutting knives carried by the frame, an operating handle for the frame, the guides including a plurality of equi-distantly spaced tongues, the spaces between the tongues being adapted to receive the knives to permit the tongues to act as guides for said knives.

3. A cutter of the character described comprising an elongated base block, a cutter block mounted on the upper face of the base block, front and rear parallel upstanding guides carried by the opposite ends of the cutter block for receiving the material therebetween, each of the guides including a plurality of equi-distantly spaced tongues, hinge barrels carried by the block, an open frame including a rear bar rockably mounted in the barrels, equi-distantly spaced longitudinal extending cutting knives carried by the open frame arranged to extend in the spaces between the tongues, an operating handle carried by the forward end of the frame.

4. A cutter of the class described comprising a cutter block, front and rear guides carried by the ends of the block for receiving the material to be cut therebetween, said guides including a plurality of upstanding spaced guide fingers, an open frame hingedly connected to the block in rear of the rear guide including inverted U-shaped guide members and a bar connecting the members together at the rear ends thereof, a forwardly extending handle carried by the frame, cross bars carried by the guide members, and a plurality of equi-distantly spaced longitudinally extending knives having arcuate cutting edges connected to the last mentioned cross bars, as and for the purpose specified.

In testimony whereof I affix my signature.

SAMUEL L. JONES.